US006324039B1

(12) United States Patent
Gross, Jr.

(10) Patent No.: US 6,324,039 B1
(45) Date of Patent: Nov. 27, 2001

(54) CIRCUIT FOR PROTECTION AGAINST SLOW CIRCUIT BREAKER CLOSURE DURING SYNCHRONIZATION OF A GENERATOR AND AN ASSOCIATED ELECTRICAL SYSTEM

(75) Inventor: Lawrence C. Gross, Jr., Pullman, WA (US)

(73) Assignee: Schweitzer Engineering Laboratories, Inc.

( * ) Notice: Subject to any disclaimer, the term of this patent is extended or adjusted under 35 U.S.C. 154(b) by 0 days.

(21) Appl. No.: 08/950,970

(22) Filed: Oct. 15, 1997

(51) Int. Cl.[7] ....................................................... H02H 7/06
(52) U.S. Cl. ................................ 361/86; 361/21; 361/78; 307/87
(58) Field of Search .............................. 361/86, 85, 76, 361/65, 20–21, 78–79, 107, 71–75; 307/87, 85–86, 44, 127; 322/20, 32, 29

(56) References Cited

U.S. PATENT DOCUMENTS

| 3,562,545 | * | 2/1971 | Rubner et al. | 307/87 |
| 3,599,007 | * | 8/1971 | Martin, Jr. | 307/87 |
| 3,601,619 | * | 8/1971 | Ringstad | 307/87 |
| 3,794,846 | * | 2/1974 | Schlicher et al. | 307/87 |
| 4,229,694 | * | 10/1980 | Wilson et al. | 324/772 |
| 4,797,570 | * | 1/1989 | Fox | 307/87 |
| 5,642,006 | * | 6/1997 | Cech | 307/87 |

* cited by examiner

Primary Examiner—Jeffrey Gaffin
Assistant Examiner—Michael J. Sherry
(74) Attorney, Agent, or Firm—Jensen & Puntigam P.

(57) ABSTRACT

The protecting apparatus includes a circuit for automatically and continuously determining the difference voltage between the voltage at the input side of a connecting circuit breaker and the voltage at an output side thereof between an electric generator and an associated power system, following initiation of closure of the connecting circuit breaker. The difference voltage is representative of the voltage angle of the generator relative to the electrical system. The difference voltage is compared against a reference value, which is selected such that a voltage angle value greater than the reference value will result in damage to the generator and/or the electrical system. An output signal is developed which can then be used to trip circuit breakers serving the electrical system if the reference value is exceeded by the difference voltage.

10 Claims, 4 Drawing Sheets

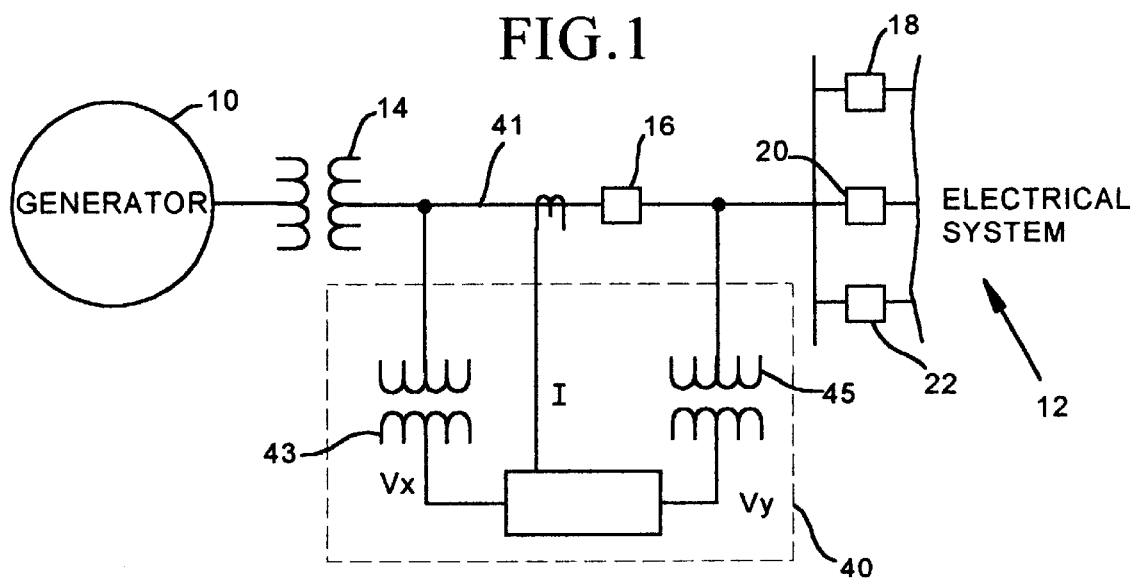
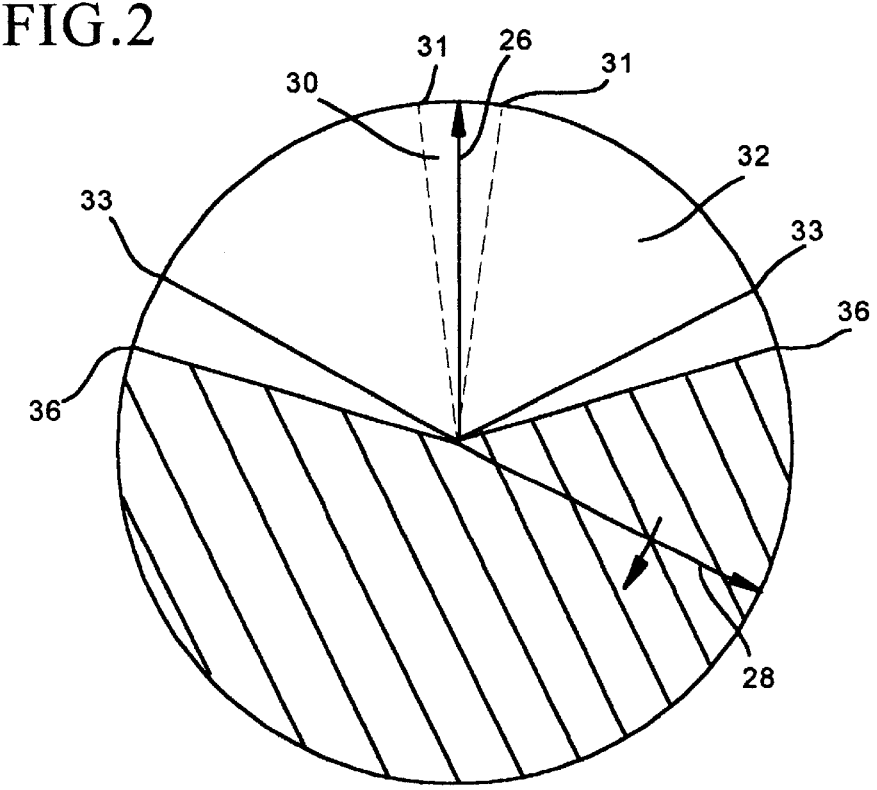

CIRCUIT FOR PROTECTION AGAINST SLOW CIRCUIT BREAKER CLOSURE DURING SYNCHRONIZATION OF A GENERATOR AND AN ASSOCIATED ELECTRICAL SYSTEM

TECHNICAL FIELD

This invention relates generally to the synchronization of an electric power generator and an associated electrical system to which the power generator is to be connected, and more specifically concerns a circuit for preventing damage to the generator and/or the electrical system when the connecting circuit breaker is too slow in closing.

BACKGROUND OF THE INVENTION

In connecting an electric generator, transformer or similar equipment to an associated electrical system, a circuit breaker connecting the generator and the electrical system is closed after selected operating conditions of the generator and the electrical system are satisfied. The connection must occur when the two systems are synchronous in their respective operation; the systems can be damaged when the breaker closes when the systems are not synchronous. The general arrangement of two connecting systems is shown in FIG. 1, which includes a generator 10, an electrical system 12, a transformer 14 and a connecting circuit breaker 16. Circuit breakers 18, 20 and 22 are associated with the electrical system 12.

Synchronous power generators are started when they are electrically isolated from the electrical system. Connecting such a generator to a power system is dynamic and requires the coordinated operation of electrical and mechanical functions as well as human action. The generator must be connected to the power system with minimal power surges or swings. This is accomplished by closing the connecting breaker (16 in FIG. 1) when the generator substantially matches the power system in voltage magnitude, phase angle and frequency. Typically, there will not be an exact match and some power will flow into or out of the generator to force it into synchronization with the power system. If that power is excessive because of a poor match, severe damage to the generator or the power system can result.

The generator 10, once started, will begin to increase in speed prior to connection with the electrical system 12, and once the speed is relatively near (typically slightly greater than) the synchronous speed appropriate for the electrical system, closure of the system circuit breaker 16 will be initiated to connect the generator to the electrical power system. Various ways have been used to determine the best point in time for initiating closure of the circuit breaker, including monitoring of the generator operating angle, the speed (frequency) of the generator and the voltage magnitudes of the generator and the power system. Typically, the generator slip frequency and the closing time for the circuit breaker are important variables in determining the time at which to initiate the closing of the system circuit breaker. The slip frequency is the difference in frequency between the generator voltage and the system voltage.

Once circuit breaker closure is initiated, however, there is no way to stop the circuit breaker from closing, even though closing may have been initiated at the wrong time and/or the closing may be too late. Attempting to reverse a partially closed breaker could result in extreme failure of the breaker.

When the circuit breaker begins to close, it will either close within the expected and acceptable time limits, or it will close slower than expected but still within an acceptable time for the power system and the generator, or lastly, the circuit breaker will not close at all, or at a slower rate than is acceptable. Delay in closing can be due to a variety of causes, including electrical problems or mechanical problems, such as corrosion, degraded lubrication, etc.

There is thus a range of angles between the voltage and the generator voltage which is acceptable at the time of actual closure of the circuit breaker. Generally, for a particular angle, as long as the circuit breaker is able to physically close without causing severe damage to the generator or electrical system, that particular difference in angle is acceptable. Existing circuit breaker controls typically take into account the estimated circuit breaker closing time and initiate closing of the breaker at such a time that when the circuit breaker actually closes, the generator and system voltage angles will be within a small difference angle. If the circuit breaker operates slower than expected, but not too slowly, it still may actually close within an acceptable angle such that damage does not result. However, if a circuit breaker operates so slowly that the generator and the system voltage angles are no longer within an acceptable range of difference, damage can result to the system or the generator. As indicated above, however, even if it is known that the breaker closing is going to take too long, the breaker could not itself be stopped from closing.

FIG. 2 is a diagram illustrating the voltage angle relationship between the generator and the system. The solid line 26 represents for illustration a system angle (at 12 o'clock), while solid line 28 represents a generator voltage angle which is rotating clockwise, due to a slightly higher frequency. The position of line 28 is for illustration only. Area 30 shown between the dotted lines 31—31 represents a "desired" voltage angle range, i.e. ±3 degrees. Area 32 between the solid lines 33—33 represents an angle difference which is beyond the desired angle difference but which is acceptable for proper operation. This could be as much as ±70 degrees. A more typical value, depending upon the particular application, will be ±10–15 degrees. If the circuit breaker, however, is even slower, it may actually close beyond lines 36—36. In this situation, the voltage angles are so different that severe system damage will result.

As indicated above, the circuit breaker takes a finite time to physically close after closure is initiated. In order to accommodate this finite time, the operator (or the automatic control system) who is initiating the closure must actually initiate closure of the breaker prior to its reaching the desired angular difference region. The actual value of generator slip and the circuit breaker close time determines the point at which the circuit breaker closure is initiated.

There are various known methods to accomplish the synchronizing process which takes into account various closing issues. The closing procedures, however, do rely on the breaker closing in a specified time. To protect against a slow breaker, a timer has been used. If the breaker does not actually close within that predetermined time, referring again to FIG. 1, breakers 18, 20 and 22 will all be tripped, thus clearing the system bus serviced by the generator. This clearing of the bus is an extreme situation and should be avoided if possible, although it is better than permitting the system to be damaged. Further, the timer is typically set very conservatively, i.e. a relatively short time, to ensure against system damage. It is thus possible that the bus circuit breakers could be tripped in a particular situation even though the system circuit breaker would have in fact closed in time.

Hence, it is desirable to provide a control circuit which monitors the actual operating characteristics of the generator and the power system such that the bus circuit breakers will trip substantially only when the system circuit breaker is in fact going to close late. Such a system would thus be both secure yet efficient for generator/power system synchronization.

DISCLOSURE OF THE INVENTION

Accordingly, the present invention is an apparatus for protecting against slow closure of a connecting circuit breaker during synchronization of an electric power generator and an associated electric power system, comprising: means for automatically determining a value representative of the voltage angle of the generator relative to that of the electrical system to which it is to be connected, following the start of closure of the connecting circuit breaker; means for comparing the representative value with a reference value; and means for developing an output signal which is used to trip circuit breakers serving the electric power system if the reference value is exceeded by the representative value.

BRIEF DESCRIPTION OF THE DRAWINGS

FIG. 1 is a simplified schematic drawing showing the connection of the circuit of the present invention relative to generator and power system synchronization.

FIG. 2 is a vector representation of the angle difference between the generator and the system, illustrating one example of selected safe regions for generator-power system synchronization.

BEST MODE FOR CARRYING OUT THE INVENTION

Figure 3:
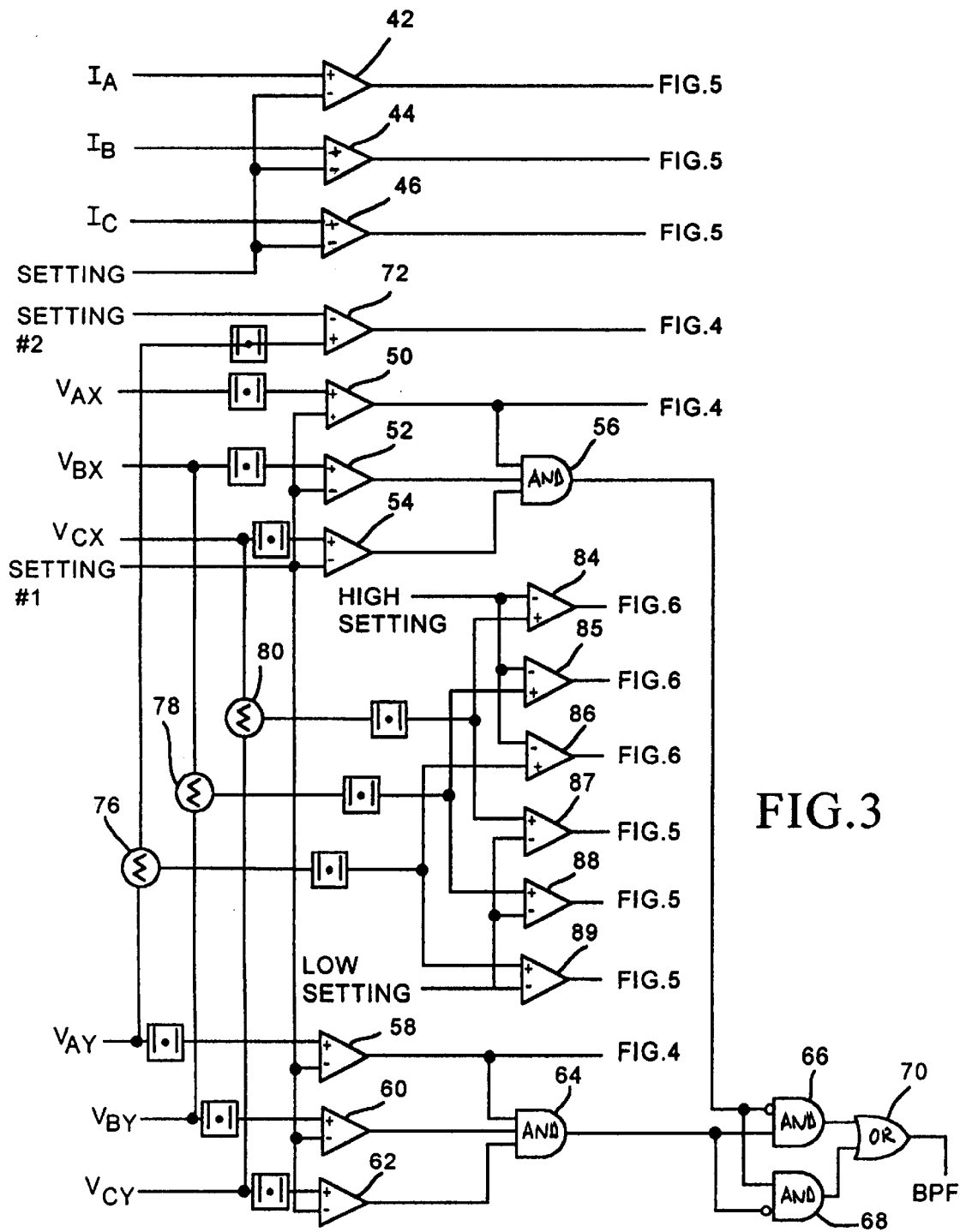
FIG. 3 is a block diagram showing a portion of the overall circuit of the present invention.

Referring again to FIG. 1, the circuit 40 of the present invention is shown in dotted lines as part of a synchronization system comprising a generator 10, an electric power system 12, a transformer 14, and system circuit breaker 16. In FIG. 1, control circuit 40 obtains two sets of voltages from the connecting power line 41, $V_X$ from before the circuit breaker 16, through transformer 43, and $V_y$ from after the circuit breaker 16, through transformer 45. Further, current I on the power line 41 is obtained. All of these values are used in the control circuit 40, as discussed below.

Referring now to FIG. 3, the currents for all three phases ($I_A$, $I_B$ and $I_C$) are compared against a threshold setting in comparators 42, 44 and 46. These comparators provide one determination as to whether the breaker 16 is in fact actually closed because of the presence of current flowing in the power line 41. If there is current, then the control circuit of the present invention is not enabled, as discussed further hereinafter.

Voltages for all three phases ($V_{AX}$, $V_{BX}$ and $V_{CX}$) from the power line before circuit breaker 16 are compared with a first threshold setting by comparators 50, 52 and 54. This threshold comparison determines whether or not there is a voltage present for all three phases before the breaker. The outputs of comparators 50, 52 and 54 are applied to an AND gate 56. The same determination is made for all three phases of the voltage following the circuit breaker 16 by comparators 58, 60 and 62. The outputs of comparators 58, 60 and 62 are applied to an AND gate 64. The output of AND gates 56 and 64 are applied to AND gates 66 and 68, the outputs of which are then applied to an OR gate 70. AND gates 66 and 68 and OR gate 70 determine whether one (or both) sides of the system breaker 16 has voltage. If only one side has voltage, which is a reliable indication that a fuse has blown (BPF), the control circuit of the present invention is disabled, as discussed more in detail hereinafter.

In addition, the voltage of one phase (phase A) of $V_X$ is compared against a second threshold setting, in comparator 72 to provide an overvoltage indication. If the value of phase A of $V_X$ exceeds the threshold, indicating an overvoltage condition, the signal from comparator 72 will be used to disable the control circuit.

Lastly in FIG. 3, each phase of voltages $V_X$ and $V_y$ are applied, respectively, to difference determination circuits 76, 78 and 80 to determine the difference voltage. The difference voltage is important in the present invention, since it is known to be representative of the voltage angle difference. The resulting difference values are then compared against a first, "high" setting in comparators 84, 85 and 86 and a second, "low" setting in comparators 87, 88 and 89. The high setting is a voltage which represents the largest voltage angle permissible (in volts) between the generator and the power system, for example 69 volts in the embodiment shown, while the low setting is small enough such that when the difference voltage drops below this setting for a selected period of time, the circuit breaker is considered to be closed. The low setting should therefore be quite small, such as, for example, 3.5 volts.

Hence, the outputs of FIG. 3 provide both threshold circuit conditions necessary for operation of the control circuit, as well as values of difference voltage which are an indication of voltage angle, which can be analyzed to reliably determine when the voltage angle difference is in or approaching the danger area so that the bus circuit breakers should be tripped to avoid damage to the system.

While the above-described circuit uses all three phases of the current and three phases of the two voltages, it should be understood that all three phases are not necessary for the present invention. One phase could be used. The three phases provide additional security and reliability.

Figure 4:
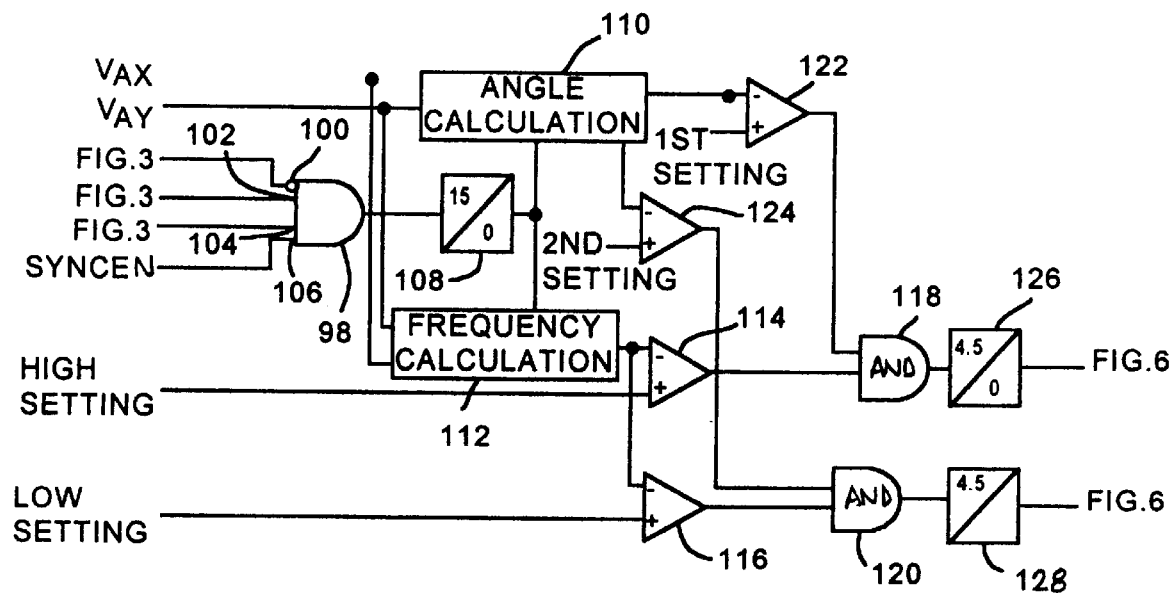
FIG. 4 is a block diagram showing a system for determining initiation of closure of a circuit breaker for synchronization of a generator and an associated power system.

FIG. 4 shows a circuit which analyzes the frequency slip and the voltage angle between the two systems to determine when closure of the circuit breaker should be initiated, given the known finite time that is required for the breaker to close. It should be understood that while the determination of whether or not the breaker should be closed at a particular point in time is necessary, the circuit shown in FIG. 4 is only one example of several different circuits and other approaches which could be used to make such a determination. A high output from timer 126 is the indication that it is an appropriate time for initiation of the closure of the circuit breaker.

Figure 5:
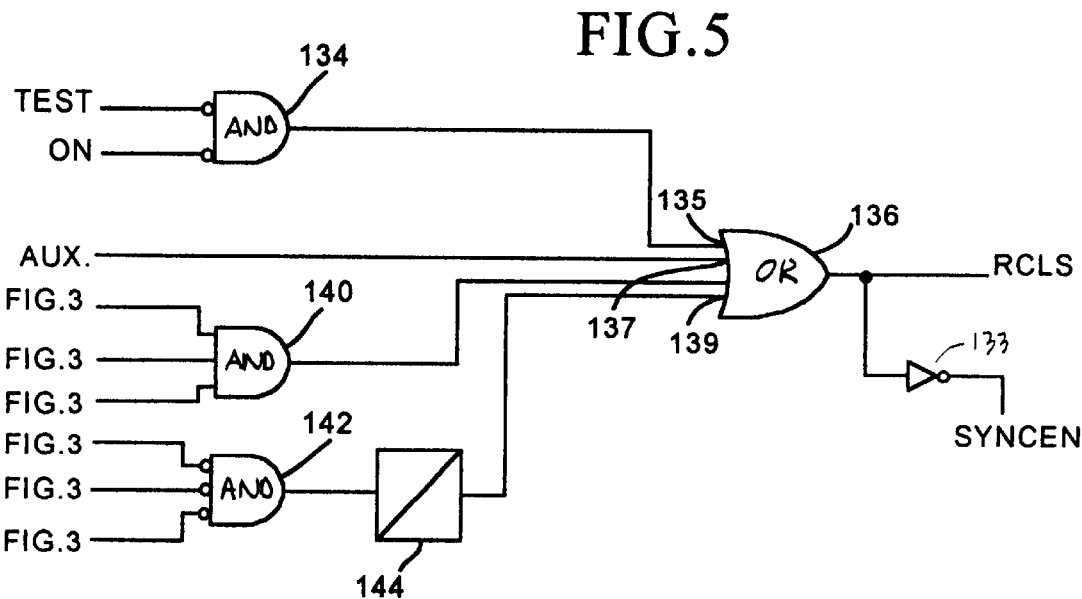
FIG. 5 is a block diagram showing the system for enabling and resetting the control circuit portion of the present invention.

The circuit of FIG. 4 has four enable conditions which are combined by an AND gate 98. A first enable condition which is applied to a NOT input 100 of AND gate 98 is the overvoltage indication from comparator 72 in FIG. 3. If an overvoltage is present, then the output of AND gate 98 in FIG. 4 will be low. The output of comparator 50 in FIG. 3, applied to input 102 of AND gate 98, indicates the presence of voltage before circuit breaker 16, while the output of comparator 58 in FIG. 3, applied to input 104 of AND gate 98, indicates the presence of voltage following circuit breaker 16. Both of these voltages must be present to enable the circuit of FIG. 4. Lastly, a SYNCEN (synchronous enable) signal from FIG. 5 is applied to output 106 of AND gate 98. If all the enable conditions are present (including a lack of overvoltage condition), the output of AND gate 98 will be high, which initiates a timer 108.

The output of timer 108 will be high after the output of AND gate 98 has been high for 15 cycles, and is applied to both an angle calculation circuit 110 and a frequency calculation circuit 112. Vector (not instantaneous) voltages $V_{AX}$ and $V_{AY}$ are used to calculate both frequency and angle. The result of frequency calculation block 112 is the frequency slip of the generator. This is a conventional calculation and the result is applied to comparators 114 and 116. Comparator 114 compares the resulting frequency slip value from calculator 112 against a first, high threshold, while comparator 116 compares the calculated frequency slip against a second, low threshold. The first (high) and second (low) thresholds provide a window of acceptable slip value. In one example, the high threshold could be 0.26, while the low threshold could be 0.008. The output of comparator 114 is applied as one input to an AND gate 118, while the output of comparator 116 is applied as one input to AND gate 120.

The $V_{AX}$ and $V_{AY}$ voltages are also used to make the angle calculation at 110. The angle calculation takes into account the slip frequency and the nominal circuit breaker close time to provide an indication of when closure of the breaker should be initiated. The circuit breaker nominal operating time is a setting established within the relay or other protective device, while the slip frequency is calculated as discussed above. The angle calculation is then compared in comparators 122 and 124 against first and second settings. The first setting is typically a desired setting, while the second setting could be a different value, although in this application it can be the same as well.

The angle comparison in comparators 122 and 124 determines that the actual voltage angle of the generator is within the desired angle range for initiation of closure of the breaker. The angle and frequency comparisons from comparators 122 and 114 are applied to AND gate 118, while the angle and frequency comparisons from comparators 124 and 116 are applied to AND gate 120. A high output from AND gate 118 indicates that the circuit is ready to close, i.e. the generator is actually not at the desired angle calculation but will be when the time-to-close of the breaker and the frequency slip are taken into account.

The output of AND gate 118 is applied to a 4.5 cycle timer 126, while the output of AND gate 120 is applied to a 4.5 cycle timer 128. Since there is a "window" of frequency slip established, the output of timer 128 should be low (indicating that the slip is above the minimum threshold, while the output of timer 126 should be high, indicating that the slip is below the maximum threshold. The outputs of timers 126 and 128 are applied to the control circuit shown in FIG. 6.

Figure 6:
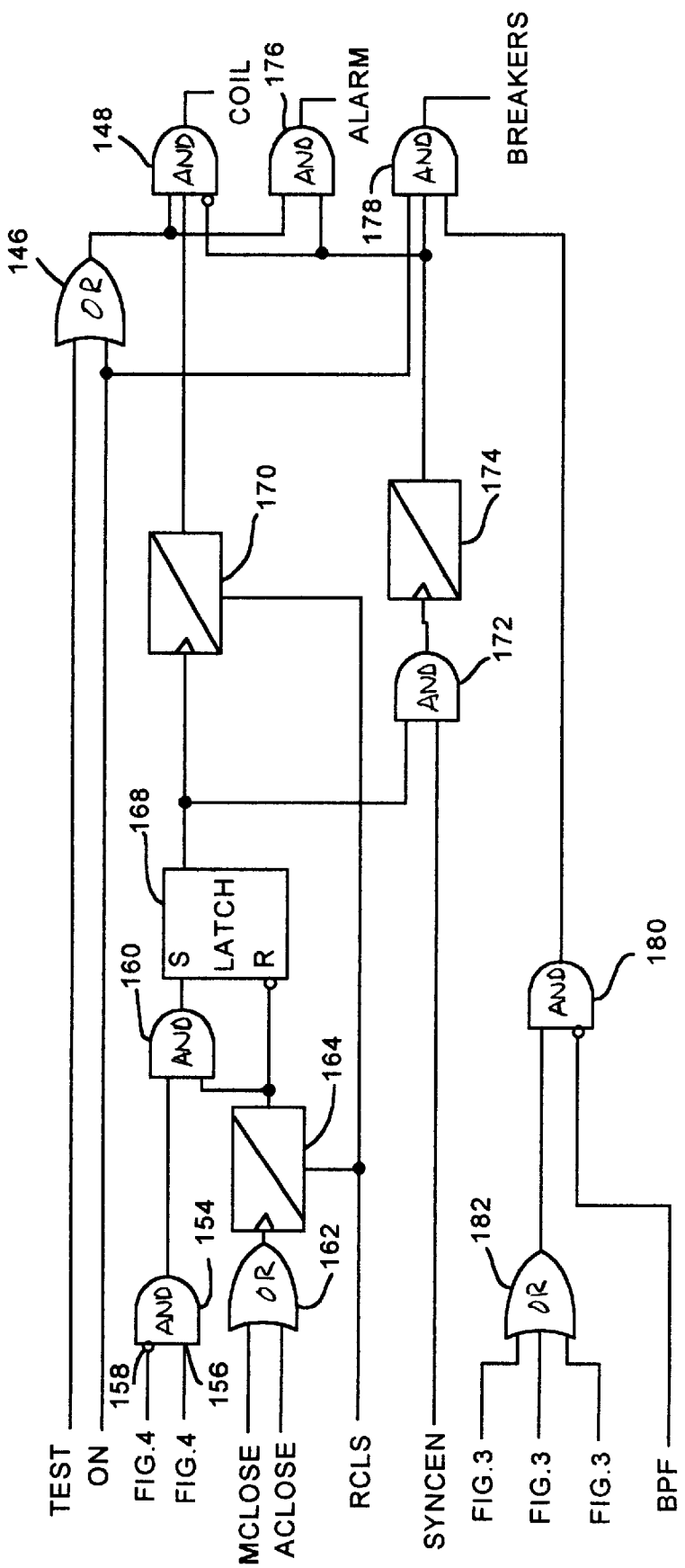
FIG. 6 is a block diagram showing the control circuit of the present invention.

FIG. 5 shows a portion of the circuit 40 which provides the SYNCEN (sync enable) signal and system reset signal RCLS, which are also applied to the circuit of FIG. 6. The circuit 40 of the present invention has three possible operator-selected conditions: (1) an OFF condition, in which the system is not operational; (2) a TEST condition, in which the system is operated under normal conditions, but the circuit breaker 16 is electrically isolated so that when it closes it does not electrically connect the generator with the system; and (3) an ON condition, in which the circuit breaker 16 is electrically connected between the generator and the electrical system.

In FIG. 5, if the system is neither in the TEST or ON condition, the output of AND gate 134 will be high to input 135 of OR gate 136, as will the output of OR gate 136 accordingly. A high output from OR gate 136 will result in a high reset signal (RCLS) and, because of inverter 133, a low SYNCEN output. A low SYNCEN signal will effectively disable the circuit of FIG. 4, so that closure of circuit breaker 16 cannot be initiated.

The second input 137 to OR gate 136 reflects the condition of an auxiliary contact, which is in a closed condition when current can flow in the power line 41 through breaker 16. In this case as well, the output of OR gate 136 is high, providing a high reset signal RCLS and a low SYNCEN signal. Still further, if the three current outputs (comparators 42, 44 and 46) from FIG. 3 are all high, as determined by AND gate 140, indicating that current is actually flowing in power line 41, there is no need to initiate a breaker closure procedure. Lastly, the low threshold difference voltage values from comparators 87, 88 and 89 in FIG. 3 are applied to three not inputs of AND gate 142. If the difference voltages are low (below the low threshold), a high signal is applied to a timer 144, which has a long enough pick up (delay) time that an output of timer 144 indicates that the circuit breaker is in fact closed. The output of timer 144 is applied to input 139 of OR gate 136. As an example, the pickup time of timer 144 in the embodiment shown is 167 cycles, based on a selected frequency slip and a desired close angle. If any of the above conditions are true, then the circuit will be reset by the RCLS signal and SYNCEN will be low.

However, if none of the above conditions is true, the output of OR gate 136 is low, so that there is no reset (RCLS) and a SYNCEN signal is present. The SYNCEN signal is applied as an enable signal back to FIG. 4.

FIG. 6 shows the key part of the control circuit 40 of the present invention. When the circuit 40 is in the TEST mode or the ON mode as selected by the operator, a high output from OR gate 146 is applied as one input to a first output AND gate 148.

The two outputs from FIG. 4 (timers 126 and 128) are applied as inputs to AND gate 154, the high threshold signal from timer 126 being applied to one input 156, and the low threshold signal from timer 128 being applied to a NOT input 158. The output of AND gate 154 will be high when the slip frequency is within the specified range and the angle based on slip frequency and breaker close time is acceptable. The output of AND gate 154 is applied to one input of an AND gate 160.

An OR gate 162 has two inputs, one input being a breaker close initiation signal (ACLOSE) by an auxiliary device, such as an autosynchronizer, while the other is a manual (operator-initiated) initiation signal (MCLOSE), from a switch.

When one of the "close" inputs is high, timer 164 is started. The output of timer 164 is applied as another input to AND gate 160. The close initiation signal sets the timer 164 running for a specified (dropout) time. If synchronous conditions are met as indicated by a high signal from AND gate 154, within the dropout time of timer 164, the output of AND gate 160 goes high, which sets a latch circuit 168. If the synchronous conditions do not occur within the dropout time of timer 164, latch 168 is reset. When latch 168 is set, timer 170 is initiated. The output of timer 170 is applied as another input to AND gate 148.

The output of latch 168 is also applied as one input to AND gate 172, the other input which is the SYNCEN signal from FIG. 5. Timer 174 is set to a preselected pickup time which allows sufficient time for the breaker to close. In the present case, as one example, the time is 5 cycles, which is based on the time the breaker should take to close. The output of timer 174 is applied to a NOT input of output AND gate 148. With a combined output of OR gate 146, timer 170 and a lack of a high signal from timer 174, the resulting output of AND gate 148 will be high, which signal is sent to the circuit breaker coil to initiate closure of breaker 16.

The output of OR gate 146 is applied as one input to a second output AND gate 176. The other input to AND gate 176 is from timer 174. When timer 174 times out, which means that the breaker should have closed but did not, a high output from AND gate 176 results, which results in an alarm, which could take various forms. In the embodiment shown, the alarm will occur whether the device is in the TEST or ON mode. However, it will do nothing to any of the elements in the electrical power system. Its primary use is for the TEST mode, to indicate that the breaker is not closing in time, although, as indicated above, it will also sound when the device is in the ON mode as well.

The output of a third output AND gate 178 is high when the device is in the ON mode, when timer 174 has timed out, and when there is an input from AND gate 180. AND gate 180 receives one input from OR gate 182. The three inputs to OR gate 182 are difference voltage indications for phases A, B and C from FIG. 3 (comparators 84, 85, and 86). If the difference in voltages between the X and Y voltages exceed the threshold, for each phase, this is a reliable indication that at that point in time the permitted voltage angle of the generator has been exceeded. Although the described embodiment uses a voltage difference determination to determine whether the permitted voltage angle has been exceeded, other methods to determine voltage angle could be used, such as an angle calculation like that shown in FIG. 4. However, regardless of the output of OR gate 182, if the BPF signal (from FIG. 3) is present, the output of AND gate 180 will be low, and there will be no output from AND gate 178.

A high output from AND gate 180, however, when a BPF signal is not present, will result in a high output from AND gate 178, when the other inputs to AND gate 178 are high. This output will be directed to breakers 18, 20 and 22 (FIG. 1), which will basically clear the bus in advance of damage occurring to the system.

Although FIG. 6 shows that the output of AND gate 178 requires that timer 174 must time out, it is possible to have an arrangement which does not require a timer 174 output. In such a case, the inputs to AND gate 178 will be an "ON" condition signal for the apparatus and the signal from AND gate 180. Also, it is possible to utilize only one phase of difference voltage input to OR gate 182. The additional phases provide additional security and reliability for the control system.

Hence, an apparatus has been described which provides secure and reliable synchronization between a power generator and an associated electrical system. The apparatus is also efficient, since instead of the protection being based solely on a specific time after initiation of breaker closure, it monitors the actual voltage angle of the generator by ascertaining difference voltages between the voltages present on the line before and after the breaker. The system in the embodiment shown provides an alarm during both test and on conditions and sends a signal tripping the bus circuit breaker.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. An apparatus for protecting against slow closure of a connecting circuit breaker during synchronization of an electric power generator and an associated electric power system, comprising:

means for automatically determining a value representative of the voltage angle of the generator relative to that of the electrical system following initiation of closure of the connecting circuit breaker;

means for comparing said representative value with a reference value; and means for developing a signal which in turn can be used to trip bus circuit breakers serving the electric system if the reference value is exceeded by the representative value.

2. An apparatus of claim 1, wherein the reference value is substantially the value of the voltage angle beyond which damage to at least one of the generator and the electric power system would occur.

3. An apparatus of claim 2, wherein the representative value is determined substantially continuously.

4. An apparatus of claim 1, wherein the representative value is the difference voltage between a voltage at an input side of the connecting circuit breaker and a voltage present at an output side of the connecting circuit breaker.

5. An apparatus of claim 4, wherein the voltages at the input and output of the circuit breaker are three phase voltages and wherein the difference voltage includes more than one phase of the three-phase voltage signal.

6. An apparatus of claim 1, including means for disabling the apparatus when current is determined to be flowing through the connecting circuit breaker.

7. An apparatus of claim 1, including means for initiating closure of the connecting circuit breaker.

8. An apparatus of claim 4, including means for disabling the apparatus if a blown fuse is detected from either the input or output voltages.

9. An apparatus of claim 1, including means for connecting said apparatus in a test mode in which the connecting circuit breaker is electrically isolated so that it does not actually connect the generator to the electrical system and wherein the apparatus includes means for providing an alarm signal if the connecting circuit breaker does not close within a specified period of time following initiation of closure when the apparatus is in the test mode.

10. An apparatus of claim 1, including means for developing the trip signal only if the reference value is exceeded by the representative value and the connecting circuit breaker does not close within a specified period of time following initiation of closure of the connecting circuit breaker.

* * * * *